United States Patent Office 3,515,674
Patented June 2, 1970

3,515,674
PROCESS FOR PRODUCING CHEMILUMINESCENCE BY REDUCTION OF THE 1,6 DIAMINOPYRENE RADICAL CATION
David M. Hercules, Arlington, and Fred E. Lytle, Cambridge, Mass., assignors to the United States of America as represented by the United States Atomic Energy Commission
No Drawing. Filed May 5, 1967, Ser. No. 637,877
Int. Cl. C09c; C09k 1/02
U.S. Cl. 252—188.3
2 Claims

ABSTRACT OF THE DISCLOSURE

A chemiluminescence process useful as an emergency light source wherein light is produced as the result of the reaction between the radical cation [1,6 diaminopyrene]$^{+\cdot}$ and a reductant.

CROSS REFERENCE TO RELATED APPLICATIONS

U.S. patent application Ser. No. 609,719, filed Jan. 13, 1967, D. Hercules et al., entitled "Process for Producing Chemiluminescence by Reduction of Metal Chelates."

BACKGROUND OF THE INVENTION

The invention described herein was made in the course of, or under a contract with the United States Atomic Energy Commission.

Chemiluminescence may be defined as the production of light by chemical reaction. Generally luminescence can result if three criteria are met. First, sufficient energy must be available from the reaction sequence to produce an excited state of one of the participating molecules. Second, these excited molecules must be capable either of emitting or transferring energy to a species that can emit. Third, the rate of the reaction must be sufficiently rapid so that photon production is detectable.

Chemiluminescence processes are useful as emergency light sources. They have an advantage in that the light source may readily be shaped to fit difficult configurations and are capable of storage for long periods without leakage of their energy.

Solution chemiluminescence to date has generally fell into three categories: reactions involving molecular oxygen or peroxides; oxidation of anion radicals; and alternating current electrolysis of aromatic hydrocarbons. It is an object of this invention to provide those skilled in the art with chemiluminescence processes wherein light is produced by an electron transfer to a potential emitter, i.e. via reduction reactions.

SUMMARY OF THE INVENTION

A chemiluminescence process comprising reacting the radical cation [1,6 diaminopyrene]$^{+\cdot}$ with a reductant selected from the group consisting of hydrazine hydrate and sodium naphthalenide. The radical cation [1,6 diaminopyrene]$^{+\cdot}$ may be prepared simply by dissolving 1,6 diaminopyrene in dimethylformamide and adding sufficient powdered lead dioxide to the solution to turn the color of the solution red-brown. Excess lead dioxide solids can be removed by centrifugation and decantation. When this procedure is employed the radical cation is in a liquid solution.

In the event that users of our novel process desire to have the radical cation [1,6 diaminopyrene]$^{+\cdot}$ in a solid compound, the radical bromide salt of the cation can be prepared by the process described by H. Scott et al., J. Phys. Chem., 69, 1740 (1965). Thus our process allows those who desire to employ it a wide latitude in selection of vehicle to be employed.

The chemiluminescence reaction is best carried out in a solvent system to increase the rate of reaction and thus increase the amount of light produced. When hydrazine hydrate is employed as the reductant, dimethylformamide is an excellent solvent and when sodium naphthalenide is employed as the reductant, tetrahydrofuran is an excellent solvent.

EXAMPLE 0.023 gram of 1,6 diaminopyrene as dissolved in 100 ml. of dimethylformamide and 2 grams of particulate lead dioxide were added to the solution. The solution was stirred until it turned reddish-brown. The lead dioxide was removed from the solution by centrifugation and decantation.

The remaining solution was mixed with 100 ml. of a dimethylformamide solution tenth molar in hydrazine hydrate and light was emitted from the mixture. The luminescence was visible to a non-dark adapted eye when the reaction was carried out in total darkness. The lifetime of the emission was about eight seconds.

What is claimed is:
1. A chemiluminescence process comprising intimately contacting the radical cation [1,6 diaminopyrene]$^{+\cdot}$ with a reductant selected from the group consisting of hydrazine hydrate and sodium naphthalenide.
2. The process of claim 1 wherein the radical cation [1,6 diaminopyrene]$^+$ is in the form of the radical bromide salt of the radical cation [1,6 diaminopyrene]$^{+\cdot}$.

References Cited
UNITED STATES PATENTS
3,311,564   3/1967   Cline _____ 252—188.3

JOHN D. WELSH, Primary Examiner

U.S. Cl. X.R.
252—301.2; 260—668